United States Patent Office 2,781,339
Patented Feb. 12, 1957

2,781,339

COENZYME CONCENTRATES AND METHODS FOR THE PREPARATION THEREOF

Milton A. Mitz and Arthur E. Heath, Chicago, Ill., assignors to Armour and Company, Chicago, Ill., a corporation of Illinois No Drawing. Application May 4, 1951,
Serial No. 224,664

11 Claims. (Cl. 260—211.5)

This invention relates to the preparation of coenzyme concentrates. The invention is particularly useful in the treatment of animal liver material to obtain therefrom active concentrates of coenzyme A, as well as concentrated mixtures of coenzyme A with various other coenzymes found in liver material.

Recent work in the enzyme field has resulted in the isolation and characterization of small, water-soluble molecules which have been named "coenzymes" and which are believed each to form an essential part of various complete enzyme molecules. Such work has established that the presence of the proper coenzyme is indispensable to a large class of enzymes in their functioning as catalysts or activators in certain reactions of metabolism in the body. For example, coenzymes such as triphosphopyridine nucleotide (TPN, coenzyme II) and diphosphopyridine nucleotide (DPN, coenzyme I, cozymase) have been found to form an essential part of certain oxidation enzymes which promote the metabolic reactions by which foods are oxidized for the release of energy. Other coenzymes which are known to exist are flavin adenine dinucleotide (FAD) and the biotin containing coenzyme named "biocytin," whose structure is not yet known.

As indicated, each of these various coenzymes is known to form a part of a complete enzyme molecule. It is believed that each coenzyme combines with a protein molecule and that the coenzyme together with the protein (apoenzyme) forms the complete "holoenzyme," thus:

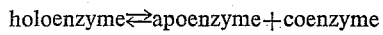
holoenzyme⇌apoenzyme+coenzyme

There are also indications that, in some cases, a specific coenzyme is capable of combining with different apoenzymes to form different enzymes.

Further work in this field has demonstrated that the coenzyme itself may be broken down into two or more components and that in most cases the important component is a vitamin. Thus the coenzyme flavin adenine dinucleotide (FAD) contains as a prosthetic group the vitamin riboflavin, and the coenzymes diphosphopyridine nucleotide (DPN) and triphosphopyridine nucleotide (TPN) contain the vitamin niacine, etc. The coenzymes are often spoken of in the literature as one form of the "bound" vitamin, since the vitamin is bound to a further chemical group to make up the coenzyme.

Thus, at least one of the functions of a vitamin, upon being taken into the body, is to combine with other necessary chemicals in the body to form a coenzyme, which in turn combines with a protein (apoenzyme) to produce the complete enzyme, thus providing the desired agent for promoting various metabolic changes necessary for nutrition of the body. Of the known water soluble vitamins, thiamine, riboflavin, pyridoxine, biotin, pantothenic acid, and niacine have been shown to exert their physiological action as described above.

Coenzymes have been shown to be distributed widely in animal and plant cells, where they play their roles in the various metabolic functions referred to above, and methods have been described for extracting certain of the individual coenzymes from the animal tissue of slaughtered animals. For example, animal liver has been found to be rich in numerous of the coenzymes, and by known methods a quantity of such material may be treated to obtain an extract containing one or the other of the several individual coenzymes found therein.

In certain pathological conditions in human beings, such as intestinal block, liver damage, and thyroid malfunction, the normal conversion of ingested vitamins into the functional coenzyme form is prevented; and since the unconverted form of the vitamin is ineffective in promoting the necessary metabolic processes, there is a dangerous impairment of these processes. However, it has been found that by obtaining a coenzyme extract from animal tissue, as indicated above, and administering it in proper dosages, this inability to convert to the vitamin, and the resulting impairment of vital processes, may in many cases be effectively overcome.

The newest of the coenzymes is "coenzyme A," which contains pantothenic acid as its vitamin component and which appears to have a multiple function in that it affects both the oxidation and acetylation processes in the body. This new coenzyme is promising as a therapeutic agent in the treatment of vitamin deficiencies and other conditions of imbalance in the body. For example, it has been found that the substance is effective in treating pantothenic acid deficient chicks and is useful as an ingredient of poultry feeds. Further, it has been observed that coenzyme A will prevent toxic effects produced by prolonged medication with sulfanilamide or other sulfa drugs, since sulfanilamide is normally converted into an acetylated derivative in which form it is excreted by the body, and, as an acetylating agent, coenzyme A assists in this conversion. Little is known at the present time concerning the manner in which panothenic acid is bound in order to form the complete coenzyme A molecule, and the known methods for obtaining this coenzyme from animal tissue have been involved and cumbersome. For example, a typical process for obtaining coenzyme A involves approximately 35 to 40 separate processing steps and produces yields so low as to be considered negligible from the standpoint of commercial practicability in large scale production.

It is an object of the present invention to provide a simple, practical method for preparing a coenzyme A concentrate. Another object of the invention is to provide a process in which coenzyme A is adsorbed from solution upon a particularly effective adsorbent, and the coenzyme A subsequently eluted from the adsorbent in concentrated form. A further object of the invention is to provide a method for treating animal liver material to obtain a crude aqueous extract of coenzyme A and thereafter concentrating said extract through the use of a specially conditioned adsorbent for the coenzyme. A still further object is to provide an active concentrated mixture of coenzymes found in animal liver material, and processes for preparing the same. Other specific objects and advantages will appear as the specification proceeds.

We have found that a crude aqueous solution of coenzyme A may be treated effectively to produce a coenzyme A concentrate by mixing the solution with acid-conditioned charcoal to adsorb the coenzyme A selectively thereon, and thereafter eluting the coenzyme from the charcoal. We have found that this specific property of acid-conditioned charcoal is particularly valuable in obtaining a coenzyme A concentrate from animal liver material, since the coenzyme may be extracted from the liver material with hot water, and the resulting crude aqueous extract treated with acid-conditioned charcoal, according to the present invention, to obtain the desired coenzyme A concentrate.

For example, in one embodiment of the invention, fresh animal liver is chilled by mixing with crushed ice and is then hashed directly into boiling water. The mixture is kept in heated condition for approximately 30 minutes, and is then cooled to room temperature by the addition of ice. After separation of the solids and further treatment with sulfuric acid to remove additional inert material, the resulting crude aqueous solution containing coenzyme A is mixed with charcoal which has been preconditioned by submerging in 10% hydrochloric acid overnight. The mixture of coenzyme A solution and acid-conditioned charcoal is stirred for about 15 minutes, and then the carbon is separated and the coenzyme A is eluted therefrom with an alkaline eluting agent.

We have found that the use of an acid-conditioned charcoal is an important and essential part of the invention and that charcoal which has not been previously conditioned with acid ordinarily either fails to adsorb any substantial quantities of coenzyme A from aqueous solutions or else holds adsorbed coenzymes so tightly as to render elution impracticably difficult. Acid-conditioned charcoal, however, absorbs coenzyme A from crude aqueous solutions selectively and almost quantitatively, while at the same time readily giving up the coenzyme to ordinary alkaline eluants in the subsequent eluting steps. The charcoal which is subjected to our acid pre-conditioning step may be any of the activated vegetable charcoals of commerce, such as for example the charcoals sold commercially as Norit and Nuchar.

The pre-conditioning step by which we treat ordinary activated vegetable charcoal to obtain an acid-conditioned charcoal comprises merely contacting the charcoal with an acid. The length of time necessary for this conditioning of the charcoal is largely dependent on the techniques employed to bring the materials together; for, as between any one molecule of charcoal and the acid necessary for its conditioning, there apparently is a completion of the conditioning instantaneously upon contact of the charcoal molecule with the acid. Therefore, the length of time required to condition a large mass of charcoal depends upon how quickly or how slowly the acid is made to penetrate the mass for contact with the individual charcoal particles. We have found that a convenient method of carrying out this step comprises merely allowing the charcoal to stand overnight submerged in an acid solution, although it is understood that other means could well be employed to bring about the necessary contact in a greatly shortened period of time. We have also found that significantly improved results are obtained by carrying out the conditioning of the charcoal with hydrochloric acid and in a separate pre-treatment step rather than merely acidifying the solution from which the coenzymes are adsorbed, although of course the latter method may be practiced, and other acids may be used, with some degree of success. It will be understood that the expression "acid-conditioned charcoal," as used in this specification and claims, refers to activated vegetable charcoal which has been conditioned as described above.

It is a further important feature of our invention that charcoal which has been acid-conditioned as described above is effective in treating a crude aqueous solution containing a mixture of the several coenzymes, including coenzyme A, which are found in animal liver material, to adsorb all these coenzymes selectively and almost quantitatively from the solution. Thus, starting with animal liver material and adjusting the conditions of the hot water extraction step so as to produce a crude aqueous solution of several of the coenzymes found in liver, and by treating such solution with acid-conditioned charcoal and thereafter eluting, we may obtain not only a concentrate of coenzyme A but also a concentrated mixture of this coenzyme with various of the other coenzymes with which it co-exists in animal liver material.

Although various of the coenzymes found in liver have been extracted individually, and it has been possible to concentrate these individual coenzymes, other than coenzyme A, by adsorption on ordinary charcoal which has not been pre-conditioned, and although previous attempts to concentrate coenzyme A by adsorption on this ordinary charcoal have proved unsuccessful, we have found now that the acid-conditioned charcoal of the present invention operates equally as well as an adsorbent for the coenzyme A and also for the various other water soluble coenzymes found in liver. It is therefore our belief that we have discovered a unique phenomenon in that we are able to take an adsorbent which is effective with respect to the liver coenzymes, other than coenzyme A, and alter this adsorbent so as to render it effective with respect to coenzyme A while at the same time retaining its effectiveness with respect to the other coenzymes.

In carrying out one embodiment of the present invention, fresh animal livers from any suitable source, such as for example beef, hog, sheep, whale, rabbit, or pigeon livers, are collected as soon as possible after slaughter of the animals and are chilled immediately to initiate the process. It is important that the liver material not be allowed to stand for any lengthy periods of time prior to use in the process, since the material contains enzymes which are capable of inactivating the liver coenzymes under ordinary conditions, and therefore if the liver is permitted to stand prior to use, the coenzymes undergo a rapid autolysis, with resulting loss in yield.

The chilled animal livers are introduced directly into boiling water, preferably in hashed condition, and the mixture is maintained in heated condition until the hot water has extracted the desired amount or the desired mixture of coenzymes. This heating step not only destroys enzymes which would otherwise inactivate the coenzymes but also, with respect to the complete metabolic enzyme, or holoenzyme, the heating denatures the protein or apoenzyme portion of the enzyme, thus separating it from the coenzyme and rendering the separated coenzyme soluble in the water.

As mentioned, the length of the heating period may be varied, according to the results desired. It has been found that certain of the coenzymes of liver (for example, diphosphopyridine nucleotide and triphosphopyridine nucleotide) are substantially completely extracted by the hot water within about the first 5 to 10 minutes of the heating period and are destroyed or rendered insoluble if the heating period is continued for as long as about 30 minutes. On the other hand, substantial quantities of coenzyme A are not extracted until about 15 minutes of the heating period have passed, and substantially complete extraction of this coenzyme is not achieved until about 30 minutes have elapsed, although the heating may be extended greatly beyond this point without adversely affecting this latter coenzyme, which appears to be extremely heat stable.

Thus, by proper adjustment of the heating period, the extraction may be varied to produce an aqueous solution containing only a single coenzyme; or predominantly two coenzymes; or a mixture of several of the coenzymes found in liver; depending upon what is desired in the final concentrated preparation. A heating period of about 30 minutes has been found satisfactory for obtaining coenzyme A substantially free of the others, while a heating period of about 15 minutes provides a mixture of coenzymes which has proved particularly satisfactory. The heating periods set out above have been described in connection with processes wherein the temperature of the aqueous mixture was maintained near the boiling point at atmospheric pressure, and it is to be expected of course that the same results could be achieved by heating for different lengths of time under different conditions of pressure and temperature. One of the apoenzymes present in liver imparts a pink color to the aqueous mixture, and we have found that the disappearance of this pink color (denoting denaturation of the apoenzyme) provides a convenient indication that the minimum length of heating has been reached, and the length of the ensuing period of heating is dependent on which coenzymes, or mixtures thereof, are desired in the final product. When the aqueous mixture is maintained at atmospheric pressure and near the boiling point, the pink color disappears within about 5 minutes, and the mixture takes on a typical brown color.

After the extraction has been carried on for the predetermined length of time, the mixture is cooled quickly and, after a separation step, the liquid extract may be further treated, if desired, with sulfuric acid to precipitate additional inert material.

The crude aqueous coenzyme solution is then mixed with a quantity of charcoal which has been acid-conditioned as already explained in this specification. Actual adsorption of the coenzymes on the acid-conditioned charcoal may be achieved in any suitable manner, as for example by mixing and agitating. We have found that satisfactory adsorption is obtained when the pH of the mixture at this stage is on the acid side. Desirable results are achieved when the adsorption is carried on with the pH within the range of 2.0 to 6.0, and the preferred level is at about 3.5.

After the coenzymes have been adsorbed on the charcoal, the solid material is separated from solution and may be washed to remove inert material. The washing agent is preferably distilled water, although beneficial results are obtained by the use of any of the well-known washing reagents, with the exception of those which fall within the category of eluants, as hereinafter defined.

The charcoal, together with the coenzymes adsorbed thereon, is next subjected to elution with an alkaline eluant. As an eluting agent, we may use any alkaline aqueous solution containing an organic solvent which is miscible with water. The solution may be made alkaline by addition of any suitable basic material, and we have found that a mixture of water, acetone, and ammonium hydroxide is quite practical in the process and produces exceedingly favorable results.

After the eluting step with an alkaline eluting agent, the solids are separated out, and the eluate is treated to recover the coenzymes as a dry product. This may be done in any convenient way for obtaining solids from solution—for example, by increasing the concentration of acetone to precipitate the coenzymes.

By employing the above method, it is possible to vary the initial heating period so as to provide a crude aqueous solution containing either coenzyme A alone or, if desired, a mixture of this coenzyme with the several other coenzymes found in liver material; and it is further possible, by use of the acid-conditioned charcoal of the present invention, to treat this crude extract to provide a concentrated, purified coenzyme product, while at the same time preserving the desired activity of the coenzymes as well as the desired proportions of individual coenzymes with respect to the others. When applied to the recovery and concentration of coenzyme A alone, the method provides a highly simplified, practical means for preparing a high potency product in commercially desirable yields. When applied to the recovery of a mixture of coenzymes, the invention affords means for achieving the highly desirable end of obtaining several products from a single quantity of valuable animal glandular material. The concentrated coenzyme mixture of the present invention may if desired be further separated into its component coenzymes; but the mixture itself provides a versatile preparation for administration in cases of coenzyme deficiencies in human beings, since the pathological conditions responsible for a deficiency of one coenzyme are very likely to cause a deficiency in several of the necessary coenzymes, and the complete deficiency may very well be overcome by administration of the single mixture of the present invention. Moreover, in cases where the deficiency is that of only a single coenzyme contained in the mixture of the present invention, administration of the mixture would be effective in remedying the specific deficiency while at the same time the introduction into the body of the other unneeded coenzymes in the mixture would not be harmful, since the coenzymes are not toxic and, within reason, have no adverse effect on the body when present in excess.

Specific examples of the process may be set out as follows:

EXAMPLE 1

In a 1 liter beaker fitted with a glass stirrer, 30 g. of a barium salt of coenzyme A (2.5 u. Co A/mg.) was suspended in 275 ml. of water, acidified to pH 2 with 140 ml. 1 N hydrochloric acid and stirred for 15 minutes. To this solution was added with efficient stirring about 180 ml. 1 N sulfuric acid until an excess was detected by testing a centrifuged sample with a drop of sulfuric acid. After no precipitate was detected, the solution was stirred for 5 minutes longer and the entire solution centrifuged. The clear yellow supernatant was mixed with 10 g. of Nuchar C–190 (acid treated). After 15 minutes of stirring, the carbon was filtered on a Buchner funnel using a Kleenex pad. The carbon was washed with water until pH 3.0. The elution of the coenzyme was begun using 0.1 N ammonia in 40% acetone. The first (A) cut was made when the eluate reached pH 5.8. A second (B) cut was made at pH 8.0. Each cut was adjusted to pH 1.8 with concentrated hydrochloric acid and precipitated with 5.5 volumes of acetone. After 2 hours at −5° C. the precipitate was obtained by drawing off the clear supernatant. After washing with acetone and ether, the product was dried and weighed. Yield:

Fraction A 181 mg_____ 40.8 u. Co A/mg.
Fraction B 277 mg_____ 12.8 u. Co A/mg.

EXAMPLE 2

96 kg. of fresh pork liver (38 minutes after the animal was killed) was mixed with an equal volume of crushed ice. Within an hour or two the chilled livers were hashed directly into four equivalents (weight) of boiling water. The hasher had been precooled by grinding ice and kept cold by the addition of small amounts of ice from time to time. The extraction water was kept hot by the direct passage of steam through the solution. After the last of the liver had been introduced into the solution, the solution was heated near its boiling point until the pinkish color left the brown solution (about 5 minutes). An equal volume of chipped ice was added to cool the solution to room temperature.

Separation of the heavy solids was effected by allowing the mixture to settle for an hour or two. The decanted brown liquid was mixed with 5 g. of filter-aid per liter and concentrated sulfuric acid added until the pH 3±0.2. The resulting precipitate was allowed to settle for one-half to one hour and the supernatant was withdrawn without disturbing the precipitate.

To the yellowish solution was added Nuchar CU (acid treated) in the amount of 15 g. of carbon per kilogram of fresh liver. The acid pretreatment of the carbon was accomplished by submerging the carbon in 10% hydrochloric acid overnight and removal of the acid by filtering and washing with water until the eluate was pH 3. The carbon was covered with water until used. (Contacts with metal were avoided for the carbon and solutions.) After stirring the carbon for 15 minutes, it was allowed to settle and the bluish supernatant liquid was decanted. The carbon was filtered on a Kleenex pad in a Buchner funnel with slight vacuum and washed with several volumes of distilled water. The adsorbent was eluted several times with a total of 1 l. of solution per kg. of liver. The eluting solution was made of 400 ml. of acetone, 600 ml. distilled water, and 1 ml. of concentrated ammonium hydroxide.

The eluate was made acid (pH 1.8) with concentrated hydrochloric acid or nitric acid and precipitated with 5.5 volumes cold absolute acetone. After two hours or longer of settling at $-5°$, the supernatant liquid was separated by carefully removing the supernatant liquid. The white precipitate was removed with the aid of fresh absolute acetone, centrifuged, mixed with fresh acetone and centrifuged again. The process was repeated with acetone and ether. The material was dried and stored in the cold. Yield: 20 g. of material having a potency of 15 u. Co A./mg.

EXAMPLE 3

5 g. of a coenzyme mixture (9.5 u. Co A/mg., 2.65% TPN, and 4.66% DPN) was mixed with 250 ml. of distilled water in a 1 liter beaker fitted with a glass stirrer. To this solution was added 20 g. of Nuchar C-190 N (acid treated) and stirring continued for 15 minutes. The carbon was filtered with suction on a Buchner funnel using Kleenex as a filter pad. The carbon was washed with distilled water and both solutions were discarded. Elution was achieved with 125 ml. of 0.1 N ammonia 40% acetone solution, and the carbon separated from the eluate by filtration. The eluate was adjusted to pH 1.8 with concentrated hydrochloric acid and precipitated with 5.5 volumes of cold acetone. After standing for two hours at 23° F., the supernatant acetone was removed and the precipitate washed into a centrifuge cup with fresh acetone. The precipitate was centrifuged and the supernatant discarded. The precipitate was mixed with fresh acetone and stirred with a glass rod until all particles were in contact with the acetone. After centrifugation, the supernatant liquid was discarded and the process repeated with acetone again and finally with ether. The product was dried, weighed, and analyzed for Co A, TPN, and DPN, with the following results.

| u. Co A/mg. | Wt. mg. | Yield of Co A in percent | Percent TPN | Percent DPN |
|---|---|---|---|---|
| 27.0 | 800 | 46 | 5.12 | 14.3 |

EXAMPLE 4

2 g. of a coenzyme mixture (9.5 u. Co. A/mg., 2.63% TPN, and 4.66% DPN) was treated in the same manner set out in Example 3 above, with the following results:

| u. Co A/mg. | Wt. mg. | Yield of Co A in percent | Percent TPN | Percent DPN |
|---|---|---|---|---|
| 28 | 370 | 55 | 7.2 | 10.3 |

EXAMPLE 5

10 g. of a coenzyme mixture (9.5 u. Co A/mg., 2.63% TPN, and 4.66% DPN) was treated in the same manner as set out in Example 3 above, with the following results:

| u. Co A/mg. | Wt. mg. | Yield of Co A in percent | Percent TPN | Percent DPN |
|---|---|---|---|---|
| 30 | 1,900 | 60 | 5.6 | 10.7 |

EXAMPLE 6

A. *Conditioning of charcoal.*—Six pounds of Nuchar C unground was placed in a 10 gallon glass jar containing 32 l. of dilute hydrochloric acid (1 part 36.5% HCl to 1 part water) which was used to condition the charcoal. The mixture was stirred thoroughly and then allowed to stand overnight at room temperature (70° F.). The acid was separated from the charcoal by filtration in three 14-inch Buchner funnels. The charcoal was washed with approximately 60 gallons of distilled water (20 gallons/funnel) until the eluate had a pH of 3.5 to 4.0. At this point the charcoal was stored under distilled water until required in the process.

B. *Collection of liver.*—Four hundred pounds, a total of 136 fresh hog livers, were collected continuously from the production line on the kill floor. No more than 35 minutes elapsed between the time the animal had been slaughtered and the liver packed in a vessel containing chopped ice. The livers were kept in this condition until hashed.

C. *Processing the liver.*—Approximately ten gallons of tap water were placed in an 80 gallon container. The water was heated to 195° to 212° F. with live steam by means of a steam hose. Approximately two hundred pounds totalling 68 livers were hashed directly into the heated water in the container with constant vigorous hand agitation using a wooden paddle. Live steam was passed through the mixture until no pink color was visible when a sample was viewed through a beaker held against a bright light. Immediately upon reaching this stage the steam was shut off. Four hundred pounds of chopped ice were added as rapidly as physically possible continuing vigorous agitation until the mixture reached room temperature (68°–70° F.). This chilling operation took approximately fifteen minutes. After the first two hundred pounds of liver had reached this stage the second two hundred pounds were processed in the same manner.

The chilled mixtures were allowed to settle for approximately two hours in order that the extract could be ladled off preparatory to passing it through the centrifuge for additional clarification. Twenty gallons of cold water (35°–40° F.) were added with vigorous agitation to the residual tissue in each container for further extraction. This extract was ladled off after a one-hour settling period and also passed through the centrifuge for further clarification. The centrifugates were held overnight at 17°–23° F. in glass-lined equipment.

D. *Purification of the extract by means of pH adjustment.*—Six pounds of Hyflo Super Cel were added to the centrifugate from step 3. Three hundred and forty-five milliliters of concentrated sulfuric acid were then added with constant agitation to a pH of 2.8–3.3. The agitation continued for one half hour after the acid addition was completed. The resulting precipitate was allowed to settle for a 1–2 hour period.

E. *Adsorption of coenzymes onto charcoal.*—The supernatant was carefully siphoned off to a glass-lined container in such a manner as not to disturb the precipitate. The precipitate was discarded. The six pounds of previously acid treated Nuchar C drained of the distilled water was vigorously mixed with the supernatant for 15–30 minutes. This mixture was then allowed to settle for one hour after which the supernatant was siphoned off and discarded. The charcoal, which had settled to the bottom of the container, was transferred in approximately equal quantity to three 14-inch Buchner funnels. The contents of each Buchner funnel was washed with a total of 10–15 gallons of distilled water.

F. *Elution of coenzymes from the charcoal.*—The activity was eluted from the charcoal in the three Buchner funnels with a total of 25 gallons of ammoniacal 40% acetone distributed equally among them. (The ammoniacal 40% acetone was prepared by adding 95 ml. concentrated ammonium hydroxide to 25 gallons of 40% cold acetone (23°).)

G. *Precipitation and drying of product.*—345 ml. of concentrated hydrochloric acid (36.5%) were added to the charcoal eluate slowly and with vigorous agitation over a period of 20–30 minutes, using glass equipment (a pH of 1.7 to 2.0 was reached). Approximately 30–40 minutes later this acidified eluate was added with constant vigorous agitation to 138 gallons of cold acetone. Agitation was continued for 30 minutes after all the eluate had been added. This mixture was then permitted to stand overnight at 17° F.

The supernatant was carefully siphoned off in such a manner as not to disturb the precipitate and the supernatant then discarded. The precipitate was rinsed from the container with acetone and further washed three times with ⅓ gallon portions of C. P. acetone followed immediately by two washings of 1 lb. each of peroxide-free ether in a cup centrifuge. Each change of acetone or ether included a very thorough mixing of the product with the solvent before centrifugation. Following the last ether wash the cups containing the product were inverted for half hour or so to rid them of other fumes prior to the final drying in a desiccator.

*Data.*—Table 1 contains the data obtained from three runs processed in this series, each employing 400 pounds of fresh hog liver as the starting material:

Table 1

| Lot No. | Weight of product in grams | Units coenzyme A activity/mg. | Total units coenzyme A | Percent T. P. N. | Percent D. P. N. |
|---|---|---|---|---|---|
| 1 | 45 | 11 | 495,000 | 5.2 | 13.2 |
| 2 | 100 | 15 | 1,500,000 | 2.8 | 7.3 |
| 3 | 90 | 10 | 900,000 | 2.63 | 4.66 |

In the foregoing examples, the percentages of triphosphopyridine nucleotide (TPN) and diphosphopyridine nucleotide (DPN) are expressed in terms of weight percentages. Since the structure of coenzyme A is not as yet known, the recovery of this substance may not be set out in terms of weight percentages, and instead the yields have been expressed as units of coenzyme A activity per milligram (u. Co A/mg.). The generally accepted unit of coenzyme A activity is that which has been described and defined by Kaplan and Lipmann in the Journal of Biological Chemistry, volume 174 (1948), page 37.

While in the foregoing description we have set out steps of the process in considerable detail for the purpose of illustrating embodiments of the invention, it will be understood that such details may be varied widely by those skilled in the art without departing from the spirit of our invention.

We claim:

1. In a process for preparing a coenzyme A concentrate, the steps of mixing a crude aqueous solution of coenzyme A with acid-conditioned charcoal to adsorb the coenzyme A thereon and thereafter eluting said coenzyme from the charcoal.

2. In a process for preparing a coenzyme A concentrate, the steps of mixing a crude acidified aqueous solution of coenzyme A with acid-conditioned charcoal to adsorb the coenzyme A thereon and thereafter eluting said coenzyme from the charcoal with an alkaline eluting agent.

3. A process for preparing a coenzyme A concentrate from animal liver material, which comprises extracting coenzyme A from said liver material with hot water to provide an aqueous solution containing coenzyme A as well as contaminants, mixing said solution with acid-conditioned charcoal to adsorb the coenzyme A thereon, and eluting said coenzyme from the charcoal.

4. A process for preparing a coenzyme A concentrate from animal liver material, which comprises mixing said liver material with boiling water; heating said mixture to liberate coenzyme A from apoenzymes and to destroy said apoenzymes as well as coenzyme A-inactivating enzymes; separating from the mixture an aqueous solution containing said coenzyme A as well as contaminants; mixing said solution with acid-conditioned charcoal to adsorb the coenzyme A thereon, and eluting said coenzyme from the charcoal.

5. A process for preparing a coenzyme A concentrate from animal liver material, which comprises mixing said liver material with boiling water, heating said mxture near the boiling point for at least 15 minutes, separating from the mixture a solution containing said coenzyme A as well as contaminants, mixing said solution with acid-conditioned charcoal to adsorb the coenzyme A thereon, and eluting said coenzyme from the charcoal.

6. A process for preparing a coenzyme A concentrate from animal liver material, which comprises (A) mixing said liver material with boiling water, heating said mixture near the boiling point for at least 15 minutes, and separating from the mixture a solution containing said coenzyme A as well as contaminants; (B) mixing activated charcoal with an acid to produce an acid-conditioned charcoal; and (C) mixing said coenzyme A-containing solution with said acid conditioned charcoal to adsorb the coenzyme A thereon and eluting said coenzyme from the charcoal.

7. A process for preparing a coenzyme A concentrate from animal liver material, which comprises (A) mixing said liver material with boiling water, heating said mixture near the boiling point for approximately 30 minutes, separating from the mixture a solution containing said coenzyme A as well as contaminants, adjusting the pH of said solution downward to precipitate a portion of said contaminants and to provide an acidified solution containing said coenzyme A and the remainder of said contaminants; (B) mixing activated charcoal with hydrochloric acid and separating from the mixture an acid-conditioned charcoal; and (C) mixing said coenzyne A-containing solution with said acid-conditioned charcoal to adsorb the coenzyme A thereon and eluting said coenzyme from the charcoal with an alkaline organic solvent.

8. In a method of preparing a concentrated coenzyme mixture containing coenzyme A in association with TPN and DPN, wherein a crude aqueous solution of the coenzyme mixture is provided, the steps of mixing said solution with acid-conditioned charcoal to adsorb said coenzyme mixture thereon, and eluting said coenzyme mixture from said charcoal.

9. In a method of preparing a concentrated coenzyme mixture containing coenzyme A in association with TPN and DPN, wherein a crude acidified aqueous solution of the coenzyme mixture is provided, the steps of mixing said solution with acid-conditioned charcoal to adsorb said coenzyme mixture thereon, and eluting said coenzyme mixture from said charcoal.

10. A process for preparing a concentrated mixture of coenzyme A in association with TPN and DPN, from animal liver, said mixture containing coenzyme A in predetermined proportion with respect to the TPN and DPN, comprising mixing said liver material with hot water, heating said mixture near the boiling point for a predetermined length of time, between about 5 minutes and about 30 minutes, depending upon the proportion of coenzyme A which is desired in the final product, separating from the mixture an aqueous solution containing coenzyme A, TPN, and DPN, as well as contaminants, mixing said solution with acid-conditioned charcoal to adsorb the coenzyme A, TPN, and DPN thereon, and eluting the said coenzymes from the charcoal.

11. A process for preparing a concentrated mixture of coenzyme A in association with TPN and DPN, from animal liver, which comprises mixing said liver material with boiling water, heating said mixture near the boiling point for a period of about 15 minutes, separating from the mixture an aqueous solution containing said coenzyme A, TPN, and DPN, as well as contaminants, mixing said solution with acid-conditioned charcoal to adsorb the coenzyme A, TPN, and DPN thereon, and eluting the said coenzymes from the charcoal.

References Cited in the file of this patent

UNITED STATES PATENTS

| | | |
|---|---|---|
| 992,254 | Rieck | May 16, 1911 |
| 2,102,315 | Grassmann et al. | Dec. 4, 1937 |
| 2,282,492 | Miyamoto | May 12, 1942 |
| 2,289,194 | Hiemenz | July 7, 1942 |
| 2,567,378 | Kennedy et al. | Sept. 11, 1951 |

OTHER REFERENCES

Nachmansohn et al.: J. Biol. Chem. 165, 1945, pp. 551–553.

Lipman et al.: J. Biol. Chem. 167, 1947, pp. 869–870.

Euler-Pope: Gen. Chem. of the Enzymes, John Wiley and Sons, 1912, pp. 81–82, 84, 85.

De Vries et al.: J. Am. Chem. Soc., 72, 4838 (1950).

Biochemical Preparations, vol. I, J. Wiley, 1949, pp. 28–33.

Merck Index, 6th ed., 1952, p. 265.